United States Patent [19]
Åström

[11] Patent Number: 6,012,003
[45] Date of Patent: Jan. 4, 2000

[54] METHOD FOR DETERMINING THE POSITIONS OF A PLURALITY OF ANONYMOUS FIXED REFERENCE OBJECTS FOR MOBILE SURFACE TRANSPORTATION AND A DEVICE FOR DETERMINING SAID POSITIONS

[75] Inventor: Karl-Erik Åström, Lund, Sweden

[73] Assignee: Apogeum AB, Sweden

[21] Appl. No.: 09/172,846

[22] Filed: Oct. 15, 1998

Related U.S. Application Data

[63] Continuation of application No. PCT/SE97/00634, Apr. 15, 1997.

[30] Foreign Application Priority Data

Apr. 15, 1996 [SE] Sweden .................................. 9601440

[51] Int. Cl.[7] .............................. G05D 1/02; G06F 165/00
[52] U.S. Cl. .............................. 701/28; 701/300; 180/169
[58] Field of Search .............................. 701/207, 23, 300, 701/28; 180/167, 168, 169; 348/118, 142

[56] References Cited

U.S. PATENT DOCUMENTS

| | | | |
|---|---|---|---|
| 4,647,784 | 3/1987 | Stephens | 250/561 |
| 4,788,441 | 11/1988 | Laskowski | 250/561 |
| 4,790,402 | 12/1988 | Field et al. | 180/169 |
| 4,811,228 | 3/1989 | Hyyppä | 364/424.02 |
| 5,367,458 | 11/1994 | Roberts et al. | 701/25 |

FOREIGN PATENT DOCUMENTS

| | | |
|---|---|---|
| 0 366 350 A2 | 5/1990 | European Pat. Off. . |
| 0 405 795 A2 | 1/1991 | European Pat. Off. . |
| 0 488 828 A2 | 6/1992 | European Pat. Off. . |
| 0 635 773 A2 | 1/1995 | European Pat. Off. . |

OTHER PUBLICATIONS

"Invariancy Methods for Points, Curves and Surfaces in Computational Vision," Kalle Åstrom, Lund Tekniska Hoögskola, May 30, 1996, pp. 39–79.

*Primary Examiner*—Michael J. Zanelli
*Attorney, Agent, or Firm*—Lerner, David, Littenberg, Krumholz & Mentlik, LLP

[57] ABSTRACT

Methods and apparatus are disclosed for determining the positions of fixed reference objects for use in controlling the movement of mobile surface transportation units over a surface. The method includes detecting bearings from a measuring point on a mobile apparatus to the reference objects at predetermined times associated with movement of the mobile apparatus over the surface, storing the bearings along with the predetermined time associated therewith, and continuously computing the position of the reference objects and the degree of uncertainty associated with those positions from the bearings whereby the degree of uncertainty is reduced as the mobile apparatus moves over the surface.

11 Claims, 2 Drawing Sheets

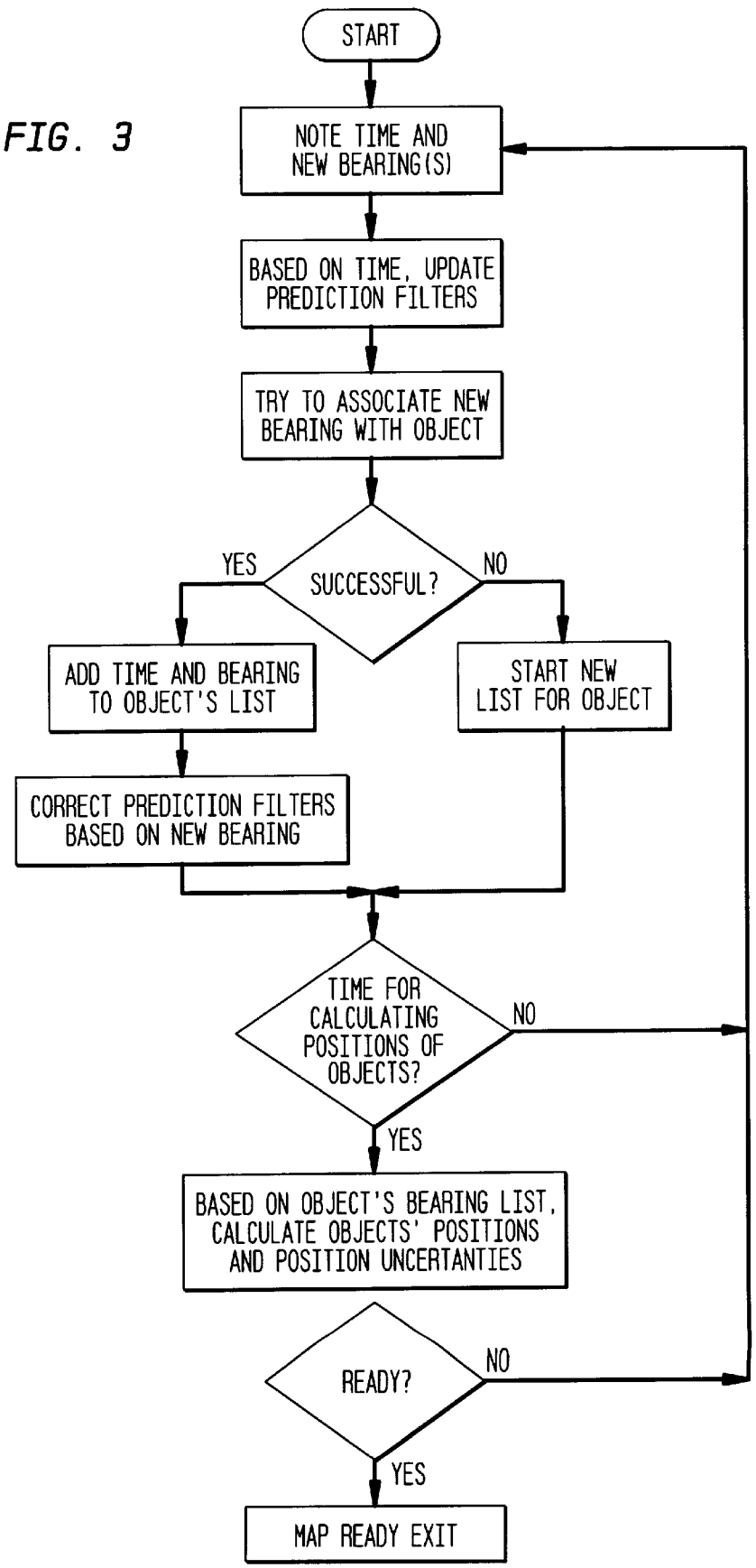

METHOD FOR DETERMINING THE POSITIONS OF A PLURALITY OF ANONYMOUS FIXED REFERENCE OBJECTS FOR MOBILE SURFACE TRANSPORTATION AND A DEVICE FOR DETERMINING SAID POSITIONS

CROSS-REFERENCE TO RELATED APPLICATIONS

This is a continuation of International Application No. PCT/SE97/00634 filed on Apr. 15, 1997.

FIELD OF THE INVENTION

The present invention relates to a method and apparatus for determining the positions of a plurality of anonymous fixed reference objects for controlling the movement of surface transportation units.

BACKGROUND OF THE INVENTION

The traditional technology for automatic control of vehicles AGV by means of following control loops in the surface has increasingly been replaced by more sophisticated control systems, such as systems which search for fixed reference points in a room. By knowing the position of the reference points and by measuring a plurality of angles to these objects, the position of the AGV can be determined and used for controlling the AGV to predetermined positions. U.S. Pat. No. 4,811,228 discloses a rotating laser which searches an area in which fixed reflecting objects are positioned, and measuring a plurality of angles between the AGV and the different objects, the position of the AGV can be determined.

When installing a new AGV system the positions of the fixed reference objects must be determined. Until now, this has, to a significant extent, been carried out manually by measuring the positions of the reference objects and entering these in a coordinate system which represents an area in which the AGV system is to be installed. To be more precise, the coordinate system generally represents a plane which extends parallel to the surface on which the vehicle AGV is intended to move. Determining the positions has therefore generally been carried out by physically measuring the position of the reference objects relative to the axes of the coordinate system, after which their coordinates have been entered into a computerized control system. The measurement is, however, time-consuming, and difficult to carry out in practice, since most rooms in which the AGV system has been installed also house large objects, such as storage shelves, machinery, and the like.

SUMMARY OF THE INVENTION

In accordance with the present invention, these and other objects have now been accomplished by providing a method for determining the position of at least one fixed reference object for use in controlling the movement of mobile surface transportation units over a surface comprising providing a mobile apparatus including a measuring point, detecting bearings from the measuring point to the at least one fixed reference object at a predetermined time associated with movement of the mobile apparatus over the surface, storing the bearings along with the predetermined time associated therewith, and continuously computing the position of the at least one fixed reference object and the degree of uncertainty associated with the position from the bearings whereby the degree of uncertainty is reduced as the mobile apparatus moves over the surface.

In accordance with one embodiment of the method of the present invention, the detecting of the bearings is carried out sequentially in time.

In accordance with another embodiment of the method of the present invention, the detecting of the bearings comprises detecting a plurality of the bearings for each value of time.

In accordance with another embodiment of the method of the present invention, detecting of the bearings comprises emitting, reflecting, and detecting an electromagnetic signal, preferably a light signal. In a preferred embodiment, the electromagnetic signal comprises a rotating laser beam extending substantially parallel to the surface from the measuring point.

In accordance with the apparatus of the present invention, apparatus has been provided for determining the position of at least one fixed reference object for use in controlling the movement of mobile surface transportation units over a surface comprising a mobile apparatus including a measuring point, a bearing detector mounted at the measuring point for detecting bearings from the measuring point to the at least one fixed reference object at a predetermined time associated with movement of the mobile apparatus over the surface, storage means for storing the bearings along with the predetermined time associated therewith, computational means for tracking the at least one fixed reference object as the mobile apparatus moves over the surface, and continuous computing means for continuously computing the position of the at least one fixed reference object and the degree of uncertainty associated with the position whereby the degree of uncertainty is reduced as the mobile apparatus moves over the surface.

In accordance with one embodiment of the apparatus of the present invention, the bearing detector comprises laser scanning means and angular detector means for sequentially detecting the bearing over time.

In accordance with another embodiment of the apparatus of the present invention, the bearing detector comprises camera means for detecting a plurality of the bearings for each value of time, the camera means including flash means.

In accordance with another embodiment of the apparatus of the present invention, the computational means includes prediction shelters.

In accordance with another embodiment of the apparatus of the present invention, the at least one fixed reference object comprises a plurality of reflector means.

In accordance with both the method and apparatus of the present invention, manual measuring can now be eliminated.

BRIEF DESCRIPTION OF THE DRAWINGS

The present invention will be more fully understood with reference to the following detailed description, which itself makes reference to the appended drawings, in which:

FIG. 3 is a flow chart showing the method according to the present invention.

DETAILED DESCRIPTION

Figure 1:
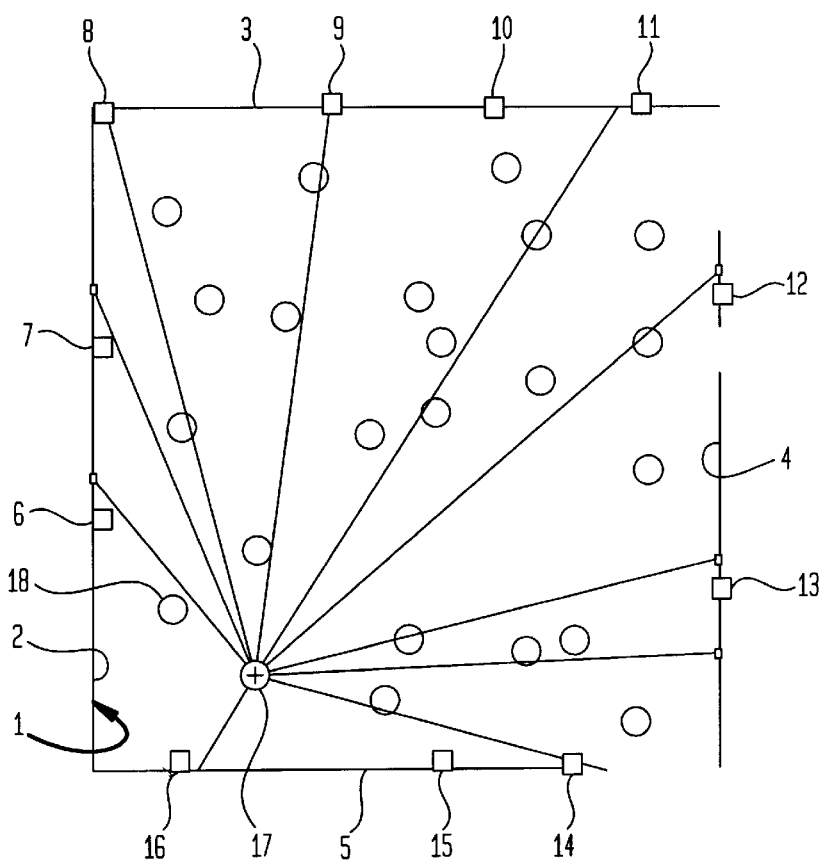
FIG. 1 is a schematic representation of a room in which the AGV is to be installed for use in accordance with the present invention.

Referring to the drawings, FIG. 1 shows a schematic plan view of a space in which an AGV system has been installed.

In the example shown, the system is based on U.S. Pat. No. 4,811,228, the disclosure of which is incorporated by reference herein, which describes the use of a rotating laser beam, which searches a plane which, for example, extends horizontally and essentially parallel to the floor on which an automatically controlled vehicle AGV is intended to move. The rotation thus principally takes place around a generally vertical axis. In the example shown, the room in question has been drawn as a square room 1 with four walls, 2, 3, 4 and 5, on which a plurality of anonymous fixed reference objects 6–16 have been positioned at such a height that they are within the search area of the laser beam. In practice, the reference objects extend vertically to such an extent that it is always possible for the object and the beam to coincide. In the system in question where the issued signal is an electromagnetic signal, such as light, for example a laser beam, the reference objects are reflector organs which are arranged to reflect an incident beam back to the laser unit where it is detected, together with information about its bearing, i.e., the angle in the plane of rotation relative to a chosen reference-angle, for example, the longitudinal axis of the vehicle. The reflector organs are preferably such that the incident beam is reflected in the same direction as the incident direction, that is so-called retro-reflectors. The reflector organs are positioned at fixed positions, which can be chose arbitrarily. In the simplified case shown in FIG. 1, the reflection organs are, however, arranged along four planes, i.e., the walls, but in practice the reflection organs can be positioned irregularly and arbitrarily in the room.

Essentially the same equipment as discussed above can be used for determining the positions of reflectors, in the simplest case, comprising a vehicle with a rotating laser. Reference numeral 17 represents the measuring point, normal to the plane of the paper, around which, for example, the search beam rotates in the measuring room 1. According to the present invention, the positions of the fixed reference objects 6–16 are determined and possibly also directions in a plane by searching the plane by means of a sweeping search-signal while detecting returned echo-signals together with the detection of information with respect to the bearing of the echo-signal. Detection takes place during movement of the measuring point 17 in the room 1, whereby a plurality of further measuring points 18 is obtained, which in principle are arbitrarily distributed across the room. In practice, the simplest way of achieving this is by moving or driving the equipment or vehicle around in the room during repeated measurement, the application of a technique called "multilinear constraints in continuous time" makes it possible to make the measurements while the vehicle with the rotation laser detector is moving.

Figure 2:
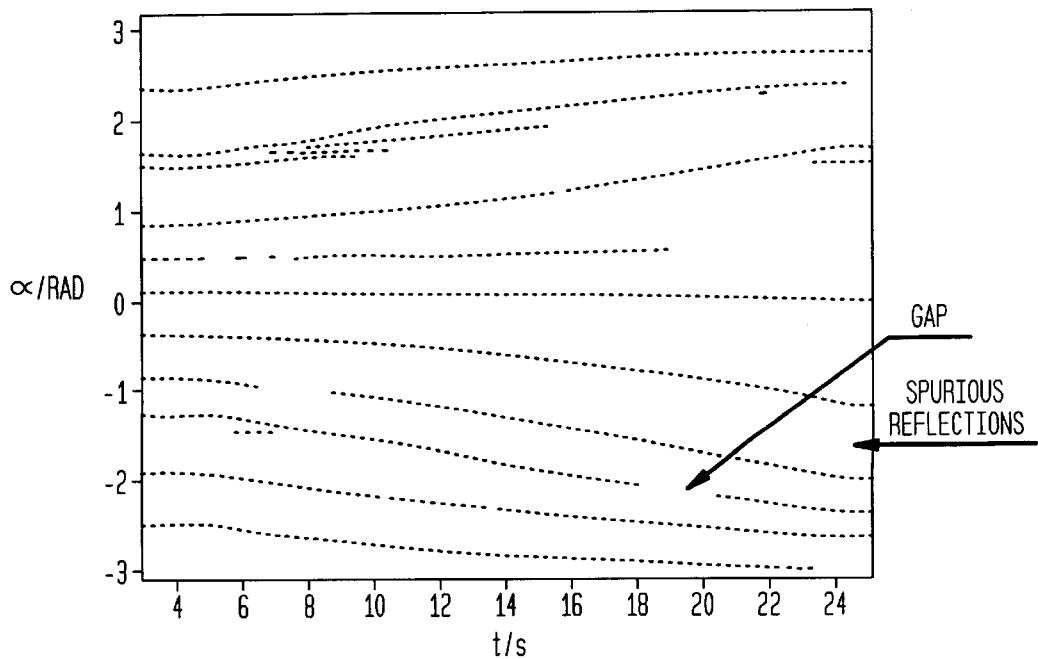
FIG. 2 is a diagram showing measured time-angle pairs for use in accordance with the present invention.

During continuous movement a number of angles or bearings fixed in time can thus be obtained. These time-angle pairs can be illustrated in a diagram, as shown in FIG. 2, where each point of coordinates $(t, \alpha)$ corresponds to a measured angle $\alpha$ with a time t. The gaps shown times when, for example, an obstacle has been within the line of sight when it was to make a measurement. False reflections are shown by small dots which do not form a regular pattern.

The present invention further describes an analysis of the angle material measured, which results in determining the coordinates of all the reflector organs. In order to obtain this, the following steps are carried out:

A. Automatic association of bearings to anonymous objects:

First, those angles are identified which have been measured to the same, anonymous reflector organ. This is effected by extrapolating earlier angle measurements and checking which of the subsequent angle measurements matches with this extrapolation. It also allows correct identification even if the reflector is temporarily hidden from the laser beam. The result is that part of the angle measurements can be grouped into subsets of the time identity, while other, spurious measurements can be sorted out.

B. Calculation of reflector positions and position uncertainties:

Starting from a crude estimation of reflector positions and a corresponding high degree of uncertainty, as the vehicle moves along and the bearings to the reflectors become available from a larger area of the floor, the position estimations are refined and the position uncertainties correspondingly reduced by application of the "continuous trilinear constraint" technique (as described in "INVARIANCY METHODS FOR POINTS, CURVES AND SURFACES IN COMPUTATIONAL VISION" by Kalle Åström, Lund Tekniska Högskola, May 30, 1996, ISBN 91-628-2022-2, ISSN 0347-8475, ISRN LUTFD2TFMA-96/1006-SE, ISRN LUTFD2TFMA-96/5002-SE) involving complex matrix calculations using e.g. the Newton-Raphson method. The above reference is hereby incorporated in the present application by reference thereto.

In accordance with the present invention, the relative motion of the vehicle can be calculated without odometry or any prior knowledge of its motion. The relative motion is thus calculated from the bearing measurements only, using multilinear constraints in continuous and discrete time.

Assuming that the bearing measurements have thus been placed in groups corresponding to the same reflector, it is possible to interpolate and find the bearing and the first two derivatives of the bearing with respect to time. Equation 1 below relates these measured quantities with the unknown relative motion of the vehicle. In this equation $u^{(0)}$ is the unit vector describing the direction of the bearing, $u_{(1)}$ represents the first and $u^{(2)}$ the second order derivatives of this direction (the bearing) with respect to time. Using Algorithm 3.4.1 (see below) it is possible to calculate the velocity vector (v1, v2) and the acceleration vector of the vehicle (a1, a2) as well as the angular velocity of the vehicle (r1). The bearings to at least five different reflectors are needed to calculate the unknown parameters. These motion parameters are thus obtained from image measurements only. Neither odometry, nor the reflector positions are required. In fact, by using this method odometry data is obtained form the bearing measurements alone.

The angular and positional velocity of the vehicle is used to calculate the motion of the vehicle using traditional dead-reckoning. Once the relative motion of the vehicle is known, the coordinates of the reflectors are calculated using triangulation. The measured bearings to a reflector from two different locations are used to find the coordinates of the reflector.

The calibrated continuous trilinear constraint is disclosed in Åström, mentioned above, as follows:

Consider the time dependent calibrated camera matrix P(t)=(R(t) c(t)).

Choose object coordinate system so that P(0)=(I 0). Let the taylor expansion of the rotation matrix R(t) and the vector c(t) be $R(t) = I + tR^{(1)} + t^2 R^{(2)} + o(t^3)$ $c(t) = 0 + tc^{(1)} + t^2 c^{(2)} + o(t^3)$ the following continuous calibrated trilinear constraint must hold for every image point u(t) with taylor expansion $u(t)=u^{(0)}+tu^{(1)}+u^{(2)}R^{(2)}+o(t^3)$ $$\text{rank}\begin{bmatrix} u^{(1)}-R^{(1)}u^{(0)} & c^{(1)} & u^{(0)} & 0 \\ u^{(2)}-R^{(2)}u^{(0)} & c^{(2)} & u^{(1)} & u^{(0)} \end{bmatrix} \leq 3. \quad (Eq. 1)$$

Since R is a rotation matrix its first derivative is of the form $$R^{(1)} = \begin{pmatrix} 0 & r_1 \\ -r_1 & 0 \end{pmatrix}$$

and the second part of the taylor expansion is of the form $$R^{(2)} = \begin{pmatrix} -r_2 & 0 \\ 0 & -r_2 \end{pmatrix}.$$

By subtracting $r_2$ of the fourth column to the second, we see that the constraint does not involve $R^{(2)}$. The constraint will now be studied in a little more detail. Introduce variables according to $$c^{(1)} = \begin{pmatrix} v_1 \\ v_2 \end{pmatrix}, c^{(2)} = \begin{pmatrix} a_1 \\ a_2 \end{pmatrix}, \quad (Eq. 2)$$

and $$u^{(0)} = \begin{pmatrix} x_0 \\ y_0 \end{pmatrix}, u^{(1)} = \begin{pmatrix} x_1 \\ y_1 \end{pmatrix}, u^{(2)} = \begin{pmatrix} x_2 \\ y_2 \end{pmatrix}. \quad (Eq. 3)$$

The determinant is of the form $$\det(M) = (v_1 \ v_2 \ a_1 \ a_2) \begin{pmatrix} T_{11} & T_{12} \\ T_{21} & T_{22} \\ T_{31} & T_{32} \\ T_{41} & T_{42} \end{pmatrix} \begin{pmatrix} 1 \\ r_1 \end{pmatrix}$$

where $$T_{11} = y_1 x_1 y_0 - x_0 y_1^2 - y_0^2 x_2 + y_0 x_0 y_2, \quad T_{12} = y_0 x_0 x_1 - x_0^2 y_1, \quad (Eq. 4)$$

$$T_{21} = -x_1^2 y_0 + x_1 x_0 y_1 + y_0 x_0 x_2 - x_0^2 y_2, \quad T_{22} = y_0^2 x_1 - y_0 x_0 y_1,$$

$$T_{31} = y_0^2 x_1 - y_0 x_0 y_1, \quad T_{32} = -y_0^3 - y_0 x_0^2,$$

$$T_{41} = -y_0 x_0 x_1 + x_0^2 y_1, \quad T_{42} = y_0^2 x_0 + x_0^3.$$

Introduce $w=(v_1 \ v_2 \ a_1 \ a_2)$ and $z=(1 \ r_1)^T$. Two tentative algorithms to find have been tried.

Algorithm 3.4.1.

1. it might be possible to get a rough idea of the rotational velocity $r_1$. Usually it is quite low.

2. For all image directions $u^1(t)$ calculate corresponding T matrix, here denoted noted $T^1$. The vector w should be orthogonal to every vector $T^1_z$. Given $r_1$, w can be found as the left null space of matrix $(T^1z \ldots T^Nz.)$ The vector w is found by singular value decomposition of the above matrix.

3. Similarity once w is known approximately, z can be found as the right null space of $$\begin{pmatrix} wT^1 \\ \vdots \\ wT^N \end{pmatrix}.$$

4. Repeat steps 2 and 3 and hope that the process converges.

The above idea has only been tried experimentally, but it has been succesful so far. Further research is needed.

Algorithm 3.4.2.

Another approach is to estimate
$S_1=v_1, S_2=v_1r_1, S_3=v_2, S_4=v_2r_1,$
$S_5=a_1, S_6=a_1r_1, S_7=a_2, S_8=a_2r_1,$
as the right null space of $$\begin{pmatrix} T^1_{11} & T^1_{12} & T^1_{21} & T^1_{22} & T^1_{31} & T^1_{32} & T^1_{41} & T^1_{42} \\ \vdots & \vdots & \vdots & \vdots & \vdots & \vdots & \vdots & \vdots \\ T^N_{11} & T^N_{12} & T^N_{21} & T^N_{22} & T^N_{31} & T^N_{32} & T^N_{41} & T^N_{42} \end{pmatrix}$$

and then impose the additional constraints that $$\text{rank}\begin{pmatrix} S_1 & S_2 \\ S_3 & S_4 \\ S_5 & S_6 \\ S_7 & S_8 \end{pmatrix} = \text{rank}(w^T z) = 1.$$

The motion parameters $(r_1,v_1,v_2,a_1,a_2)$ can then be found by singular value decomposition.

The two principal steps A and B discussed above can then be applied sequentially in an outer and an inner loop, in accordance with FIG. 3.

The flow chart of FIG. 3 further shows how these above-mentioned steps can be applied. Thus, in the inner loop the bearing and time values are sorted and associated with the reflectors. The prediction filters used take into account the movement that is continuously imposed on the vehicle. The outer loop is performed when a sufficiently high number of measurements and/or a sufficiently high number of additional reflectors has been added. First, the already known reflector positions are refined, and these new values then constitute the basis for calculating the positions, and uncertainties, of the additional reflectors. When the position of all reflectors has been calculated and the position uncertainties have been reduced to the required level, the reflector map is complete and the measurements finished.

In the example in question the reflector organs 6–16 have a limited are of reflection, within which detection can be obtained, which may be used for determining the direction of the reflector organs 9 and thereby also whether a received reflex has been received form a certain reflector organ. The measurement equipment comprises a computer for collecting measuring data relating to received reflexes and their bearing.

Although embodiments of the present invention have been described in detail with reference to the appended figures, it should be realized that the present invention is not limited to these specific embodiments, and that different changes or modifications can be made by a person skilled in the field without deviating from the scope defined by the appended claims. The reference objects can, for example, be natural objects in any environment.

Furthermore, for each time value, more than one bearing may be registered, e.g., by detecting a plurality of object bearings simultaneously with the aid of a matrix detector (e.g., a camera/flash system).

I claim:

1. A method for determining the positions of at least one fixed reference object for use in controlling the movement of mobile surface transportation units over a surface comprising: providing a mobile apparatus including a measuring point; detecting bearings from said measuring point to said at least one fixed reference object at a predetermined time associated with movement of said mobile apparatus over said surface; storing said bearings along with said predetermined time associated therewith; and, continuously computing the position of said at least one fixed reference object and the degree of uncertainty associated with said position from said bearings whereby said degree of uncertainty is reduced as said mobile apparatus moves over said surface.

2. The method of claim 1 wherein said detecting of said bearings is carried out sequentially in time.

3. The method of claim 1 wherein said detecting of said bearings comprises detecting a plurality of said bearings for each value of said time.

4. The method of claim 1 wherein said detecting of said bearings comprises emitting, reflecting and detecting an electromagnetic signal.

5. The method of claim 4 wherein said electromagnetic signal comprises a light signal.

6. The method of claim 4 wherein said electromagnetic signal comprises a rotating laser beam extending substantially parallel to said surface from said measuring point.

7. Apparatus for determining the position of at least one fixed reference object for use in controlling the movement of mobile surface transportation units over a surface comprising: a mobile apparatus including a measuring point; a bearing detector mounted at said measuring point for detecting bearings from said measuring point to said at least one fixed reference object at a predetermined time associated with movement of said mobile apparatus over said surface; storage means for storing said bearings along with said predetermined time associated therewith; computational means for tracking said at least one fixed reference object as said mobile apparatus moves over said surface; and, continuous computing means for continuously computing the position and the degree of uncertainty associated with said position whereby said degree of uncertainty is reduced as said mobile apparatus moves over said surface.

8. The apparatus of claim 7 wherein said bearing detector comprises laser scanning means and angular detector means for sequentially detecting said bearings over time.

9. The apparatus of claim 7 wherein said bearing detector comprises camera means for detecting a plurality of said bearings for each value of said time, said camera means including flash means.

10. The apparatus of claim 7 wherein said computational means includes prediction filters.

11. The apparatus of claim 7 wherein said at least one fixed reference object comprises a plurality of reflector means.

* * * * *

UNITED STATES PATENT AND TRADEMARK OFFICE
CERTIFICATE OF CORRECTION

PATENT NO. : 6,012,003
DATED : January 4, 2000
INVENTOR(S) : Karl-Erik Åström

It is certified that error appears in the above-identified patent and that said Letters Patent is hereby corrected as shown below:

Column 4, line 22, "LUTFD2TFMA" should read --LUTFD2/TFMA--
Column 4, line 23, "LUTFD2TFMA" should read --LUTFD2/TFMA--
Column 4, line 38, "$u_{(1)}$" should read --$u^{(1)}$--.

Signed and Sealed this

Twelfth Day of December, 2000

Attest:

Q. TODD DICKINSON

Attesting Officer     Director of Patents and Trademarks